2,832,808

ALKYLATION OF HYDROQUINONE

Richard O. Zerbe, Nitro, W. Va., assignor to Monsanto Chemical Company, St. Louis, Mo., a corporation of Delaware No Drawing. Application December 8, 1955
Serial No. 551,730

4 Claims. (Cl. 260—625)

The present invention relates to the alkylation of hydroquinone. More particularly the invention relates to an improved method of condensing alcohols and olefines with hydroquinone wherein more than one hydrogen atom in the hydroquinone nucleus is replaced.

In the case of hydroquinone, the extent of alkylation is independent of the molar ratio of alkylating agent. The condensation of hydroquinone with tertiary butyl alcohol always resulted in the production of only mono tertiary butyl hydroquinone except under completely anhydrous conditions in the presence of a particular ratio of zinc chloride, according to Bean and Donovan U. S. Patent 2,511,193. Only monobutyl hydroquinone was reported by Niederl from diisobutylene and hydroquinone employing concentrated sulfuric acid catalyst in acetic acid solution, J. Am. Chem. Soc. 55, 2572. Similarly, Calcott et al. reported monoisopropyl hydroquinone from reacting 3 moles of hydroquinone and 6 moles of isopropyl alcohol in the presence of hydrogen fluoride catalyst and with a much larger excess of isopropyl alcohol obtained dehydroxylation to the polypropylated monohydric phenol instead of polyisopropyl hydroquinone, J. Am. Chem. Soc. 61, pp. 1010–1015 (1939).

While dialkylation of hydroquinone with amylene in the presence of a large excess of concentrated sulfuric acid has been known since 1892 (Koenig, Ber. 25, 2649), the essentially anhydrous conditions and large excess of catalyst had long been regarded as critical, especially since attempted dialkylation in the presence of catalytic amounts of sulfuric acid always failed. Moreover, Orelup et al. reported only monobutyl hydroquinone from molecular amounts of hydroquinone and tertiary butyl alcohol with about eight times their quantity of 70% sulfuric acid in water, U. S. Patent 2,226,177 of December 24, 1940. However, Orelup et al. were in error. Actually they obtained a poor yield of dibutyl hydroquinone. This is the only product which forms. It has been found that reaction of 2 moles of alcohol or olefin with 1 mole of hydroquinone in the presence of an excess of dilute sulfuric acid gives excellent yields of dialkyl hydroquinone.

Reaction in aqueous medium is important for a number of reasons. Fire hazard of organic solvents is eliminated, the yields are better than with concentrated sulfuric acid and the product is easier to wash and purify, thereby enabling the manufacture of lighter colored and more color stable products. Concentrated sulfuric acid even at low temperature tends to form colored by-products as well as sticky oils and gums difficult to remove. The by-products are insoluble in water and washing with flammable organic solvents is necessary for their removal whereas reaction in dilute sulfuric acid reduces the formation of colored impurities. It was found that the hydroquinone could be warmed to reaction temperature in the diluted acid without deleterious effect. Smooth, easily controlled reaction takes place upon gradually adding the alkylating agent at reaction temperature.

The diluted sulfuric acid serves as reaction medium or solvent for the hydroquinone as well as condensing agent. The amount of diluted acid should be sufficient to provide a fluid reaction mixture which mixes readily on stirring. The mole ratio of $H_2SO_4$ per mole of hydroquinone should be at least two and preferably at least six. Presence of organic solvent is neither required nor desirable during the condensation and aqueous washing of the product is usually sufficient to produce a product of satisfactory light color.

Tertiary alcohols and olefines condense with hydroquinone by the present process in quantitative or nearly quantitative yield of dialkyl hydroquinone. In other words, aliphatic alkylating agents containing a carbon atom linked to three other carbon atoms, which carbon atom is either additionally linked to an hydroxyl group or is attached to one of the three carbon atoms by a double bond, by the present process rapidly and completely replace two nuclear hydrogen atoms. Typical examples of suitable alcohols comprise tertiary butyl alcohol, tertiary amyl alcohol and tertiary hexyl alcohol.

Cheap olefine cuts available from petroleum are suitable alkylating agents under a variety of conditions. For example, the olefine fraction may be added to a suspension or solution of the hydroquinone in the acid-water medium and condensation effected by supplying heat if necessary. However, the cheaper olefine fractions generally contain appreciable quantities of paraffinic hydrocarbons and other constituents which do not condense readily with phenols and where desired most of these may be removed prior to the condensation by adding the olefine to part or all of the diluted acid and an inert oily layer drawn off before admixing with the phenol. This has the effect of providing a high concentration of tertiary olefine which then condenses rapidly with phenol but in either case under mild reaction conditions the same selective reactivity is attained.

Typical examples of tertiary olefines which are suitable for use in the present process comprises the following: 2-methyl 1-butene, 2-methyl 2-butene, 4-methyl 2,4-pentadiene, 2-methyl 2,4-pentadiene, 2-methyl 1,3-butadiene, 2,3-dimethyl 1,3-butadiene, 3-methyl 2,4-pentadiene and isobutylene.

It should not be inferred that the present process is confined to tertiary alcohols and olefines. Alkylation with other agents may be effected and other alkylating agents are contemplated in the present process. Further examples of alkylating agents comprise isobutyl carbinol, 2-methyl 3-pentene, secondary butyl alcohol, styrene, and 1,3-butadiene. While the majority of reactions studied took place below 100° C., higher temperatures are also contemplated.

The following examples are specific embodiments of the invention for purposes of illustration and are not to be taken as limitative.

Example I

Substantially 25 parts by weight of hydroquinone was suspended in substantially 400 parts by weight of 65% sulfuric acid. Over a period of about 45 minutes 50 parts by weight of trimethylethylene were slowly added to the efficiently stirred mixture of hydroquinone and acid at a temperature of 26–45° C. A white voluminous precipitate identified as diamyl hydroquinone separated immediately. Stirring was continued for about 2¾ hours and the acid drawn off. The residue was sucked dry on a filter and washed with water until the washings were acid free and then washed with dilute soda ash solution until slightly alkaline and again with water until neutral. The diamyl hydroquinone so obtained was a white crystalline product which melted at 178–179° C. without further purification. The yield was quantitative.

Substantially quantitative yields were obtained with either 60% or 70% sulfuric acid reaction medium but the yield dropped to about 95% when the reaction was carried out in 50% sulfuric acid. The quantity of sulfuric acid employed in the foregoing example provides a reaction medium which remains quite fluid and can be readily stirred and poured. However, equally good results so far as yield is concerned are obtained with lesser quantities of acid. For example the reaction of 25 parts by weight of hydroquinone with 50 parts by weight of trimethylethylene in a reaction medium consisting of 270 parts by weight of 70% sulfuric acid gave a quantitative yield of diamyl hydroquinone, M. P. 180° C. It should be noted that the acid reaction medium may be reused to effect further condensations.

*Example II*

Substantially 25 parts by weight of hydroquinone was dispersed in substantially 400 parts by weight of 70% sulfuric acid. 50 parts by weight of tertiary butyl alcohol was passed through a dehydrating tower at 315.5°–335° C. charged with $Al_2O_3$ and the isobutylene so produced led into the acid suspension of hydroquinone. The isobutylene was added over a period of about 45 minutes at 24.5–44° C. Stirring was continued for about an hour and a half and the acid then separated from the white crystalline product. The solid material was slurried in water in the presence of a wetting agent and the residual acid neutralized with sodium carbonate, again filtered and washed until the washings were neutral. There was obtained an excellent yield of dibutyl hydroquinone, M. P. 211–212° C.

The same product was obtained by substituting di-isobutylene for isobutylene under the foregoing conditions. Thus, the diluted acid depolymerized the di-isobutylene.

*Example III*

In this example a pentene fraction having the following analysis was employed as the alkylating agent:

| | Percent by volume |
|---|---|
| n-Butane | 0.1 |
| 2-methyl 1-butene | 1.4 |
| 2-methyl 2-butene | 54.3 |
| n-Pentane | 11.6 |
| Iso pentane | 7.6 |
| Pentene-1 | 2.8 |
| Pentene-2 | 18.9 |
| Pentadiene | 2.9 |
| Hexanes | 0.1 |
| Hexenes | 0.3 |

Substantially 25 parts by weight of hydroquinone were suspended in 400 parts by weight of 70% sulfuric acid and then substantially 81 parts by weight of the pentene fraction added over a period of 20 minutes while keeping the temperature of the reaction mixture at 20–24° C. The amylated hydroquinone precipitated immediately as a white fluffy mass. Stirring was continued for about an hour to complete the reaction at which time the temperature had reached 31° C. The bulk of the acid was drawn off and replaced with water. After slurrying with the water, the bulk of the dilute acid was again drawn off and replaced with water containing a small amount of wetting agent. After stirring thoroughly with the water the slurry was transferred to a filter and sucked dry. The filter cake was washed with water and dilute soda ash solution until the washings were neutral and then washed with petroleum ether and dried. Diamyl hydroquinone, M. P. 177° C., was obtained in excellent yield.

*Example IV*

Substantially 10 parts by weight of hydroquinone was added to 360 parts by weight of 77% sulfuric acid and the mixture heated to about 60° C. to effect solution. The solution was cooled to 50° C. and 16 parts by weight of tertiary butyl alcohol added gradually. The reaction commenced immediately as evidenced by cloudiness followed by precipitation of the dibutyl hydroquinone. The mixture was stirred thoroughly until precipitation was complete. The acid layer was then drawn off and the residue slurried with water and finally with a dilute soda ash solution. The solids were then sucked dry on a filter, washed with water and dried at 70° C. A good yield of di-tertiary butyl hydroquinone was obtained.

Substantially 55 parts by weight of hydroquinone was added to 358 parts by weight of 71.1% sulfuric acid. To the hydroquinone contained in the dilute acid solution was added gradually 88.9 parts by weight of tertiary butyl alcohol. The mixture was stirred and gradually heated to about 70° C. until the reaction was complete. The solids were then filtered off and washed with water until neutral. Dilute solutions of mild alkalies are useful to neutralize any residue of acid. However, the use of organic solvents to remove colored bodies is unnecessary when alkylation is effected in dilute acid at low temperatures. The yield of di-tertiary butyl hydroquinone obtained after drying was 99% of theory. The white crystalline product without further purification melted at 218–220° C.

*Example V*

Substantially 55 parts by weight of hydroquinone was added to 559 parts by weight of 70% sulfuric acid. To the hydroquinone contained in dilute acid was gradually added 105.5 parts by weight of tertiary amyl alcohol. The reaction mixture was stirred thoroughly and gradually heated to about 70° C. for about an hour or until reaction was complete. The solids were then removed and washed thoroughly with water and dilute aqueous solution of a wetting agent. Neutralization of residues of the acid catalyst was facilitated by washing with a dilute aqueous solution of sodium bicarbonate. An excellent yield of white crystalline diamylhydroquinone melting at about 165–170° C. was obtained after drying.

Somewhat better results as regards quality of the product are obtained by carrying out the alkylation at a lower temperature in which case somewhat longer time should be allowed for reaction. For example substantially 55 parts by weight of hydroquinone were added to 560 parts by weight of 70.3% sulfuric acid. To the mixture so prepared 116 parts by weight of tertiary amyl alcohol was gradually added and the reaction mixture heated at about 40° C. for about two hours or until precipitation was complete. The white fluffy solid was separated from the spent acid and residual acid removed by slurrying with water and mildly alkaline solutions. In this manner there was obtained after drying a nearly quantitative yield of white, crystalline diamylhydroquinone melting above 178° C. and usually within the range of 178° to 182° C.

*Example VI*

Into a glass or glass lined vessel of suitable capacity there was charged 27.5 parts by weight of hydroquinone, 52 parts by weight of styrene and 250 parts by weight of 40% sulfuric acid. Under vigorous agitation the charge was heated to 85° C. at which temperature the hydroquinone was nearly all in solution. The mixture was heated and stirred for 2 hours at 85° C. and then the stirring discontinued and the layers allowed to separate. The lower acid layer was drawn off at 80° C. and the upper product layer washed with warm water, dilute sodium bicarbonate solution and again with warm water. The product was dried and any volatile constituents removed by topping to 90° C. under 9 mm. pressure. There was obtained 68.3 parts by weight of diphenethylhydroquinone which was a viscous light red syrup when hot but a soft resin at 25° C.

It is intended to cover all changes and modifications of the examples of the invention herein chosen for purposes of disclosure which do not constitute departures from the spirit and scope of the invention.

The present application is a continuation-in-part of copending application Serial No. 209,321, filed February 3, 1951, and application Serial No. 773,511, filed September 11, 1947, both applications now abandoned.

What is claimed is:

1. The improvement in the process of replacing two nuclear hydrogen atoms of hydroquinone in the presence of sulfuric acid which comprises dispersing one molecular proportion of hydroquinone in dilute sulfuric acid within the range of 50%–80% concentration and in amount sufficient to provide a fluid reaction medium, then adding at reaction temperature but below 100° C. at least two molecular proportions of an alkylating agent selected from the group consisting of alcohols and olefines containing at least four but less than seven carbon atoms and dialkylating essentially all of the hydroquinone.

2. The improvement in the process of replacing two nuclear hydrogen atoms of hydroquinone in the presence of sulfuric acid which comprises dispersing one molecular proportion of hydroquinone in dilute sulfuric acid within the range of 50%–80% concentration and in amount sufficient to provide a fluid reaction medium, then adding at reaction temperature but not more than about 70° C. at least two molecular proportions of a tertiary olefine containing less than six carbon atoms and dialkylating essentially all of the hydroquinone.

3. The improvement in the process of replacing two nuclear hydrogen atoms of hydroquinone in the presence of sulfuric acid which comprises dispersing one molecular proportion of hydroquinone in dilute sulfuric acid within the range of 50%–80% concentration and in amount sufficient to provide a fluid reaction medium, then adding at reaction temperature but not more than about 70° C. at least two molecular proportions of a tertiary alcohol containing less than six carbon atoms and dialkylating essentially all of the hydroquinone.

4. The improvement in the process of replacing two nuclear hydrogen atoms of hydroquinone in the presence of sulfuric acid which comprises dispersing one molecular proportion of hydroquinone in dilute sulfuric acid within the range of 60%–80% concentration and in amount sufficient to provide a fluid reaction medium, then adding at about 40° C. at least two molecular proportions of tertiary amyl alcohol, the molar ratio of sulfuric acid to hydroquinone being at least six and continuing the heating at the aforesaid temperature until reaction is complete and essentially all of the hydroquinone charged is converted to diamyl hydroquinone.

References Cited in the file of this patent

UNITED STATES PATENTS

| | | |
|---|---|---|
| 2,051,473 | Evans et al. | Aug. 18, 1936 |
| 2,226,117 | Orelup et al. | Dec. 24, 1940 |
| 2,448,942 | Winkler et al. | Sept. 7, 1948 |